United States Patent [19]

Okabe

[11] Patent Number: 5,535,125
[45] Date of Patent: Jul. 9, 1996

[54] NAVIGATION SYSTEM DATA RECORDABLE BY USER, RECORDING MEDIUM THEREOF, AND METHODS FOR RECORDING/REPRODUCING TO/FROM THE SAME

[75] Inventor: Masanobu Okabe, Kanagawa, Japan

[73] Assignee: Sony Corporation, Tokyo, Japan

[21] Appl. No.: 425,301

[22] Filed: Apr. 17, 1995

Related U.S. Application Data

[63] Continuation of Ser. No. 171,105, Dec. 21, 1993, abandoned.

[30] Foreign Application Priority Data

Dec. 30, 1992 [JP] Japan ..................... 4-360202

[51] Int. Cl.⁶ .......................... G06F 165/00; G11B 13/04
[52] U.S. Cl. ...................... 364/449; 340/995; 369/275.3
[58] Field of Search ..................................... 364/449, 460, 364/443; 395/600; 340/995; 342/357, 457; 360/135; 369/275.1, 275.3

[56] References Cited

U.S. PATENT DOCUMENTS 4,571,684  2/1986  Takanabe et al. .................... 364/449
4,954,959  9/1990  Moroto et al. ...................... 364/449
5,142,521  8/1992  Terashima et al. .................... 369/50
5,291,462  3/1994  Richards ............................ 369/13
5,317,549  5/1994  Maeda et al. ....................... 369/32

FOREIGN PATENT DOCUMENTS 2157035A   3/1984   European Pat. Off. .
0346979A2  12/1989  European Pat. Off. .
0431590A3  6/1991   European Pat. Off. .

Primary Examiner—Michael Zanelli
Attorney, Agent, or Firm—Limbach & Limbach

[57] ABSTRACT

In a composite disc having a read-only area and a recordable area, user data corresponding to a map information which has been preliminarily recorded in a read-only area, is recorded to the recordable area, so that the user data corresponding to the map information can be written on the magneto-optical disc. Thereby, there can be realized a navigation system in which a large volume of user data can be reserved without a provision of a back-up power source and easiness in use is markedly improved.

44 Claims, 7 Drawing Sheets

| | 16 BITS | | 16 BITS | | |
|---|---|---|---|---|---|
| | MSB  LSB | MSB  LSB | MSB  LSB | MSB  LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster | Cluster | 00000000 | 00000000 | 3 |
| | 00000000 | 00000000 | 00000000 | 00000000 | 4 |
| | 00000000 | 00000000 | 00000000 | 00000000 | 5 |
| CORRESPONDING TABLE DESIGNATING DATA PORTION | | | | | 6 |
| | | | First TNO | Last TNO | 7 |
| | | | | Used Sectors | 8 |
| | | | | | 9 |
| | | | | | 10 |
| | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| MANAGEMENT TABLE PORTION (255 PARTS TABLES) | (01) START ADDRESS | | | TRACK MODE | 78 |
| | END ADDRESS | | | LINK DATA | 79 |
| | (02) START ADDRESS | | | TRACK MODE | 80 |
| | END ADDRESS | | | LINK DATA | 81 |
| | (03) START ADDRESS | | | TRACK MODE | 82 |
| | END ADDRESS | | | LINK DATA | 83 |
| | (FC) START ADDRESS | | | TRACK MODE | 580 |
| | END ADDRESS | | | LINK DATA | 581 |
| | (FD) START ADDRESS | | | TRACK MODE | 582 |
| | END ADDRESS | | | LINK DATA | 583 |
| | (FE) START ADDRESS | | | TRACK MODE | 584 |
| | END ADDRESS | | | LINK DATA | 585 |
| | (FF) START ADDRESS | | | TRACK MODE | 586 |
| | END ADDRESS | | | LINK DATA | 587 |

FIG. 4

NAVIGATION SYSTEM DATA RECORDABLE BY USER, RECORDING MEDIUM THEREOF, AND METHODS FOR RECORDING/REPRODUCING TO/FROM THE SAME

This is a continuation of application Ser. No. 08/171,105 filed on Dec. 21, 1993 now abandoned.

BACKGROUND

1. Field of the Invention

The present invention relates to a navigation system using a recording medium and a recording and/or reproducing method for the navigation system. More particularly, the present invention relates to a navigation system for detecting, for example, the positional information of a vehicle, and a recording medium for recording such detected information.

2. Background of the Invention

Heretofore, in a navigation system to be mounted in a vehicle, map information recorded on a CD-ROM (compact disc read-only memory) consisting of an optical disc is read by an optical pick-up to display on a monitor. The monitor displays a map on which the present position of the vehicle and the like received from an artificial satellite are indicated.

Such a navigation system is disclosed by U.S. Pat. No. 4,571,684, for example.

However, in the navigation system of that type, since its CD-ROM disc is large in diameter, there is the problem that the reproducing unit for reading the recorded information on the CD-ROM becomes too large.

Because of this reason, it is necessary to install the reproducing unit in a location remote from the driver such as, for example, in the trunk or under the seat. This is very troublesome for the driver when he is required to replace the CD-ROM.

Moreover, since the CD-ROM is a recording medium for read-only operation, the user cannot record any data on the recording medium.

In contrast, a rewritable semiconductor memory can be used as a recording medium which can be recorded by the user.

However, there is a problem in that the amount of information which can be stored in the memory is limited. Also, there is another problem that when the user stores the user data in the memory contained in the system body, the data is stored in a manner unrelated to the CD-ROM. Therefore, it becomes difficult for the user to judge which data in the memory corresponds to which CD-ROM.

There is still another problem that in order to maintain the information stored in the semiconductor memory, a provision of a back-up power source becomes absolutely necessary. If the navigation system is to be mounted on a vehicle, there is the problem that the battery is wasted.

Besides the above, there is another conventional device in which user data of the navigation system is recorded on a card-like recording medium. However, this recording medium is not yet satisfactory in view of its recording capacity.

Furthermore, the device must be provided with both the playback unit of the CD-ROM and that of the card-like recording medium. There is, therefore, a problem in downsizing of the entire system.

SUMMARY OF THE INVENTION

It is, therefore, an object of the present invention to provide a recording medium used in a navigation system which resolves the above-mentioned problems.

It is another object of the present invention to provide a navigation system using a recordable recording medium which resolves the above-mentioned problems.

It is a further object of the present invention to provide a recording and/or reproducing method of a navigation system.

According to the present invention, there is provided a recording medium, in which: a first area which has been preliminarily recorded with map information is formed; a first management area for recording information which manages the above map information recorded in the first area is formed on a part of the above first area; a second area which is recordable is formed; a second management area for recording information which manages the map information recorded in the first area is formed as a part of the above second area; and the first and second management areas are enabled to be associated with each other, in order that the map information recorded in the first area and the information to be recorded in the second recording area are enabled to correspond to each other.

According to the present invention, there is provided a navigation system which comprises: a position sensor for detecting a present position information upon receipt of a radio wave from a satellite; recording and/or reproducing means for reproducing a map information which has been preliminarily recorded on an magneto-optical disc and user data which has been recorded by the user, and recording a predetermined user data on the magneto-optical disc; navigation control means for calculating the present position in accordance with a position information signal outputted from the position sensor and controlling the recording and/or reproducing means; display means for displaying a predetermined image thereon in accordance with a reproducing signal obtained from the recording and/or reproducing means and the position information signal obtained from the navigation control means; and a user manipulation part for selecting desired modes of the recording and/or reproducing means and the navigation control means, respectively.

According to the construction so far described, by using a magneto-optical disc including both a read-only area in which a predetermined map data has been preliminarily recorded and a recordable recording and reproducing area the user can write a desired user data corresponding to the map data in the recording and reproducing area. This, there can be realized a navigation system which is markedly improved in easiness of use.

Furthermore, owing to the arrangement in that the user data is recorded on the recordable magneto-optical disc, the user data can be reserved without a provision of a back-up power source.

Moreover, owing to the arrangement in that there is employed such a small-sized magneto-optical disc as having a diameter of 64 (mm) for recording a map information and a user data, there can be realized a navigation system which is markedly smaller in size compared with the conventional systems.

BRIEF DESCRIPTION OF THE DRAWING

The invention will be more readily understood with reference to the accompanying drawings, wherein:

FIG. 4 is a schematic diagram showing a corresponding table designating data and a management table in detail.

DESCRIPTION OF THE INVENTION

Preferred embodiments of this invention will be described with reference to the accompanying drawings.

(1) General Construction

Figure 1:
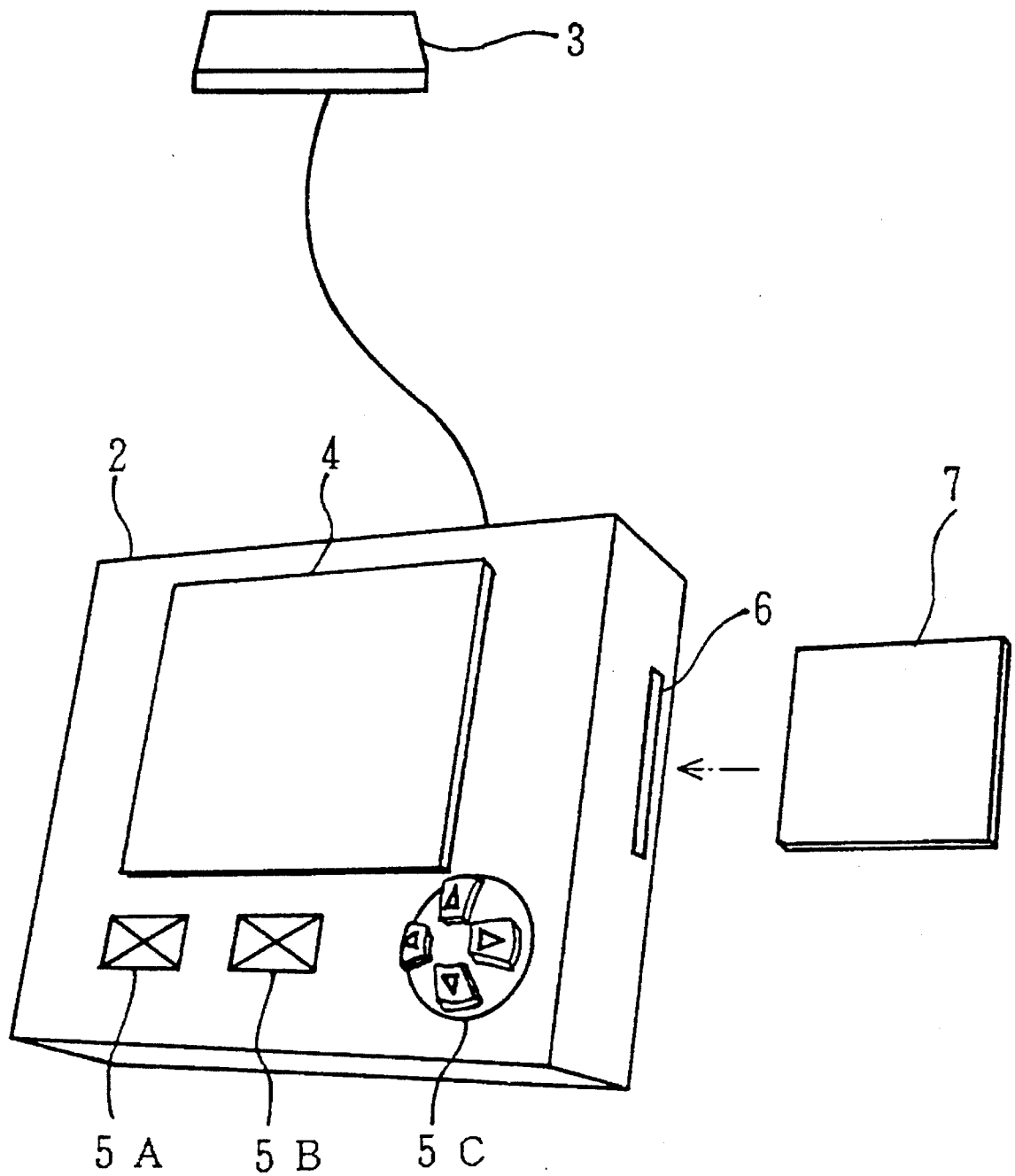
FIG. 1 is a schematic diagram showing one embodiment of a navigation system of the present invention.

FIG. 1 shows a navigation system in general. In a navigation system 1, positional data obtained by a position sensor 3 is input into a system main portion 2 containing a navigation computer.

The position sensor 3 receives position information signals from an artificial satellite and the navigation computer calculates the present position of the vehicle in accordance with such received signals.

A display screen 4 and manipulation elements 5A, 5B, and 5C are arranged on a front surface of the system main portion 2. Various kinds of information including positional information, which are obtained by the navigation computer, are displayed on the display screen 4. The mode of the navigation computer is switched in various ways by the user's manipulation of the manipulation parts 5A to 5C.

Further, an insertion slot 6 for a recording medium is formed in a side surface of the system main portion 2. A magneto-optical disc 7 having a diameter of 64 mm contained in a disc cartridge is inserted through the insertion slot 6.

The system main portion 2 contains a recording and/or reproducing unit for reproducing the information recorded on the magneto-optical disc 7 and recording information onto the magneto-optical disc 7.

The navigation system 1 is capable of displaying the information recorded on the magneto-optical disc 7 on the display screen 4 and recording desired user information on the magneto-optical disc 7.

Here, the magneto-optical disc 7 has a recording capacity of approximately 200 Mbyte. This arrangement makes it possible for the user to write on the magneto-optical disc 7 a markedly large volume of information compared with the conventional storage means such as a RAM (random access memory), or the like.

In the navigation system 1, owing to such an arrangement that the predetermined information can be recorded on and reproduced from the magneto-optical disc having a diameter of 64 mm, a markedly large volume of information can be recorded thereon without a provision of a back-up power source compared with the conventional case, and the system itself can be made compact in size.

Further, in this navigation system 1, when the system 1 is to be mounted in a vehicle, the system main portion 2 can be located at a front surface of a front panel in the vicinity of the driver's seat. It can also be used as a portable or hand-carried device.

(2) Recording and/or Reproducing Unit

Figure 2:
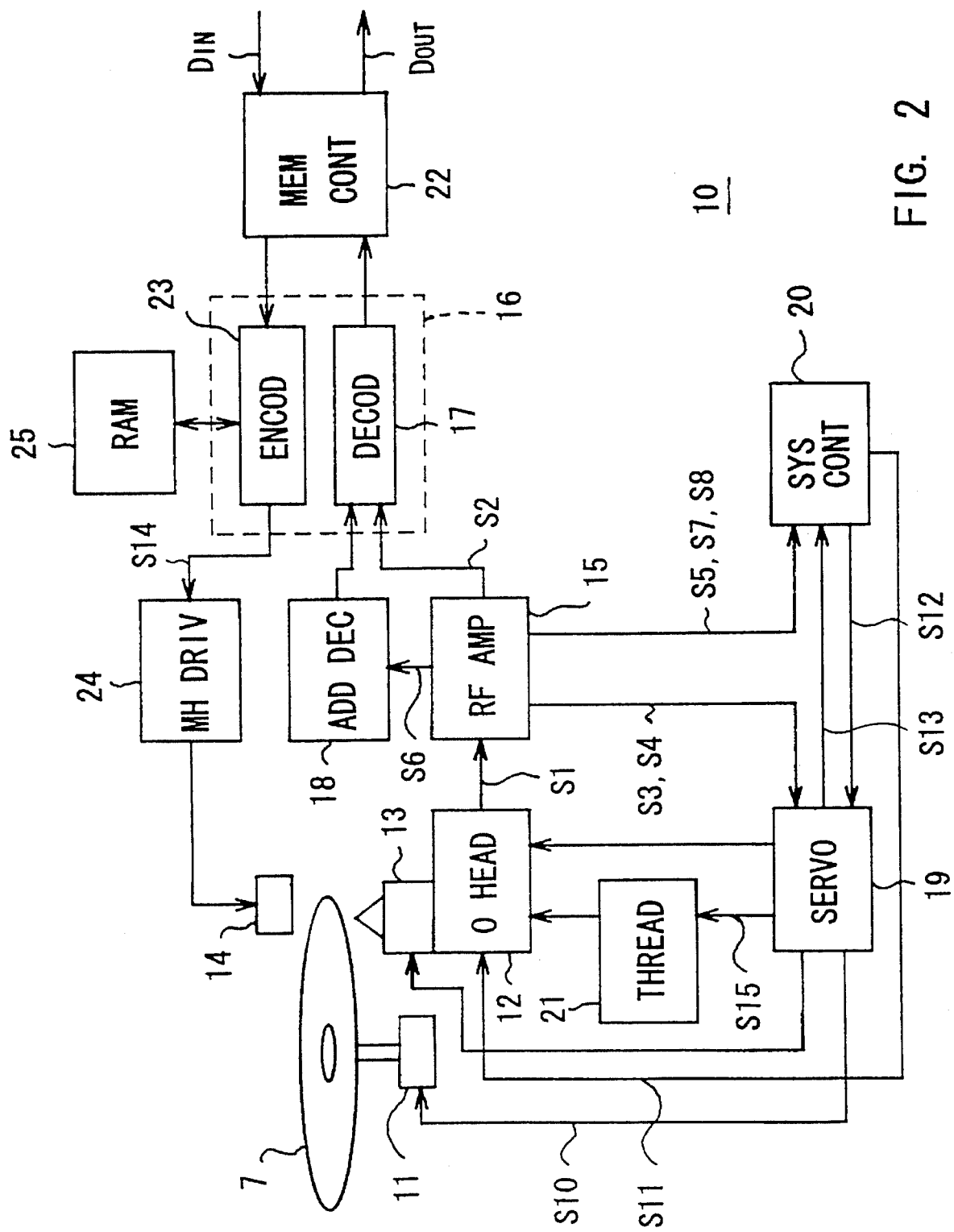
FIG. 2 is a block diagram showing a construction of a recording and/or reproducing unit.

FIG. 2 shows the recording and/or reproducing unit 10 built in the system main portion 2 from FIG. 1.

In the recording and/or reproducing unit 10, the magneto-optical disc 7 having a diameter of 64 mm is rotationally driven by a spindle motor 11.

In the recording and/or reproducing unit 10, by applying a modulated magnetic field corresponding to the recording data to the magneto-optical disc 7 through actuation of a magnetic head 14 when an optical beam is being radiated onto the magneto-optical disc 7 from a light emitting/receiving portion 13 of an optical head 12, the recording data is thermomagnetically recorded by means of the application of a magnetic modulation recording system, thereby recording data input DIN from an external device along a recording track on the magneto-optical disc 7.

In the recording and/or reproducing unit 10, a light beam is radiated from the light emitting/receiving portion 13, from which a reproducing signal S1 is supplied to a high-frequency amplifier 15 as an output corresponding to the reflected light from the disc 7.

The high-frequency amplifier 15 extracts a reproducing high-frequency signal S2, a tracking error information signal S3, a focus error signal S4, an absolute position information signal S5, an address information signal S6, a sub-code information signal S7, a focus monitor signal S8, etc. and converts the reproducing high-frequency signal S2 into a binary format in order to supply it to a decoder 17. The amplifier 15 also supplies the address information S6 to an address decoder 18.

The high-frequency amplifier 15 supplies the tracking error signal S3 and the focus error signal S4 to a servo circuit 19, and also supplies the absolute position information signal S5, the address information signal S7, and the focus monitor signal S8 to a system controller 20.

The servo circuit 19 sends servo driving signals S10 and S11 respectively to the spindle motor 11 and the light emitting/receiving portion 13 in accordance with the tracking error signal S3, the focus error signal S4, and a seek command signal S12 from the system controller 20, in order to effect spindle controlling, tracking controlling, and focusing controlling.

Also, the servo circuit 19 sends a drive signal S15 to a thread control circuit 21 to move the optical head 12 and the magnetic head 14 onto the targeted recording track.

The servo circuit 19 outputs the information S13 representative of the operating conditions of various parts such as the focus control circuit, etc. to the system controller 20, so that the operating conditions can be recognized by the system controller 20.

Here, a recording system of the recording and/or reproducing unit 10 inputs digital signals $D_{IN}$ sent from the navigation computer to a signal processing section 16 through a memory controller 22.

Within the signal processing section 16 an encoder 23 performs an encoding processing or procedure (adding of parity codes and interleave processing) in order to correct errors, and then performs an EFM (eight fourteen modulation) encoding processing or procedure.

Such encoded digital data S14 in accordance with a recording format of the magneto-optical disc 7 in the encoder 23 is supplied to a magnetic head driving circuit 24 to actuate the magnetic head 14, thereby forming a modulated magnetic field corresponding to the data S14 to be recorded.

Simultaneously, the system controller 20 controls the action of the signal processing portion 16, and also the positions of the optical head 12 and magnetic head 14, thereby continuously recording the digital data in predetermined recording tracks.

In a reproducing system of the recording and/or reproducing unit 10, a decoder 17 of the signal processing section 16 receives decoded address data from the address decoder 18 and binary data S2 outputted from the high frequency amplifier 15 and effects an EMF demodulation processing and an error correction processing.

At this time, the decoder 17 temporarily stores the reproduced data in a memory (RAM) 25 and reads the reproduced data from the RAM 25 in order to carry out the above processing.

Thereafter, the recording and/or reproducing unit 10 sends the digital data output from the decoder 17 to the navigation computer through the memory controller 22.

(3) Magneto-Optical (MO) Disc

Figure 3:
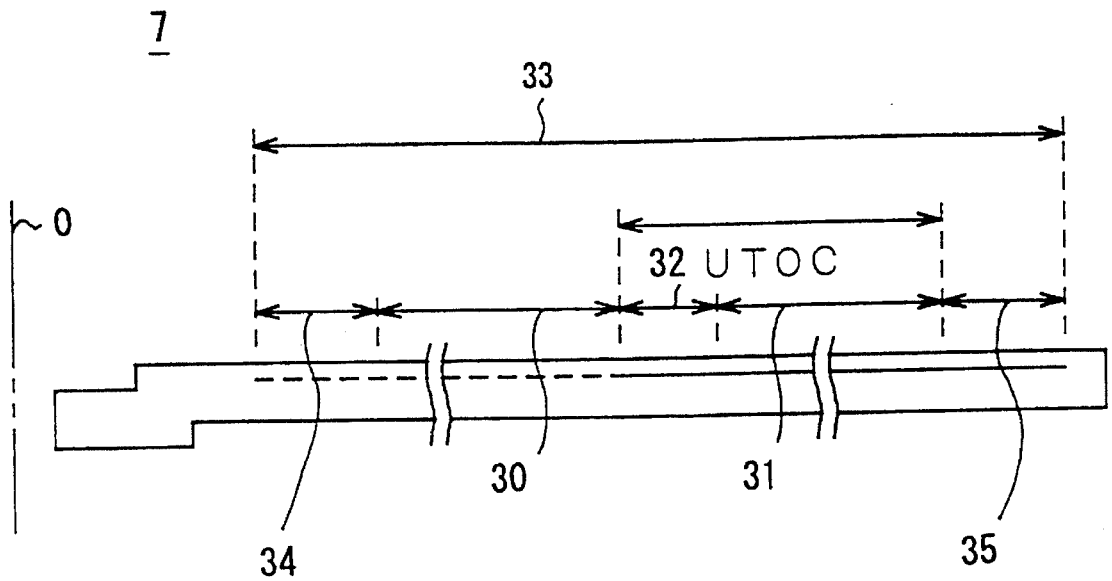
FIG. 3 is a schematic diagram showing a data construction for a magneto-optical disc.

As shown in FIG. 3, the magneto-optical disc 7, similar to a compact disc, is of a composite disc structure, in which there are provided a read-only area 30 formed with pits, in which predetermined information has been preliminarily recorded, and a recording and reproducing area 31 and a user table of contents area 32 are formed with a vertically magnetized film in which the desired data can be recorded and from which the desired data can be reproduced.

In the magneto-optical disc 7, the lead-in area 34 and a lead-out area 35 are formed respectively at the innermost periphery and outermost periphery.

In the lead-in area 34, management information representative of kind and the like for the magneto-optical disc 7 of this type are recorded.

This information managed in the lead-in area 34 is referred to as "PTOC" (Program Table of Contents).

In the lead-out area 35, various data that represent, for instance, the outermost periphery of the disc and the end position of the recording area, are recorded.

In the magneto-optical disc 7, the UTOC (User Table of Contents) area 32 is formed at an inner peripheral side of the recordable and/or reproducible recording and reproducing area 31 such that the recorded data can be managed using this area.

The predetermined map data is preliminarily recorded in the read-only area 30. In the above PTOC, the addresses of the map data on the magneto-optical disc are recorded.

The reproducing unit reads the PTOC data, and moves the optical head 12 (in FIG. 2) to the physical position (address) on the magneto-optical disc thus designated by the PTOC data, to read the data.

This read data in which three-dimensional information regarding the position on the map includes latitude, longitude, and height, and is memorized as a table.

The respective latitude, longitude, and height is divided into a predetermined interval (for example, latitude and longitude are divided into units of seconds, and height is divided into units of 300 meters), thus the amount of data and its precision are determined in accordance with the divided width.

Moreover, in the above table, a file number which records the respective position on the map, and an MO disc address are recorded on the magneto-optical disk.

The above map data is composed of a grid into which the whole map display is divided and the grid is, for example, 300 (m)×300 (m) area as one block. The file number and the data designated by the address data on the magneto-optical disc, are corresponding to one-block thus separated.

The data designated by the file number and the address data recorded on the magneto-optical disc, is composed of, for example, design information (color data), character information (character data of tourist information, latitude, longitude, height, etc., and landmarks such as buildings and the like), road information (display of one-way traffic, approach angle to crossroads, and data of distance to the next crossroads), etc.

Next, the recording and reproducing area 31 in FIG. 3 will be described below.

As described above, the UTOC area 32 is formed at the inner periphery side of the recordable area 31. The UTOC manages information which the user wants to add as, for example, annotation data. In the case where the user wants to read for example, symbols such as an arrow or the like, voice data, date, character data and the like, the UTOC preliminarily manages each of them as an individual file.

As shown in FIG. 4, the UTOC consists of a data area of 4 bytes×587.

In the data area of FIG. 4, data which are composed of the sector using state, disc discriminating data, etc., are recorded at a predetermined address position succeeding to the header.

The designating data to the corresponding table is also managed and the table records various table pointers (P-DFA to P-TNO255) corresponding to each file recorded on the magneto-optical disc.

In the above corresponding table designating data, the data designating the management table portion of FIG. 4 (in concrete, data labelled (01) to (FF)) is recorded.

Here, the contents of the management table labelled (01) to (FF) are each referred to as a "parts table".

The management table portion consists of parts tables each having start address and end address information which are absolute lot numbers on the magneto-optical disc, succeeding link information designating the parts table information representing whether or not prohibition on overwrite and data-copy are set, and track mode information representing whether or not the data referred to is audio data and if so, whether it represents monaural sound or stereo sound.

When the link data is not connected to another parts table, "00" is recorded. When the link data is connected to a parts table, data which designates a position on the management table of the succeeding parts table (in concrete, data of (01) to (FF)) is recorded.

In the management table of FIG. 4, respective parts tables of (01) to (FF) are referred to by table pointers of the corresponding table designating data (P-DFA, P-EMPTY, P-FRA, P-TNO1 to P-TNO255).

The table pointer P-DFA (Pointer for Defective Area) recorded in the area of FIG. 4 manages defective areas on the magneto-optical disc. In short, it manages areas on the magneto-optical disc which have a defective area owing to a scratch, a finger mark, or the like as an unrecordable area.

If any disconnected defective areas are found on the magneto-optical disc, these are connected by the link data.

On the other hand, if no other defective area is found, the link data is set for example to "00", which represents no link and thus the end of the chain.

Figure 5:
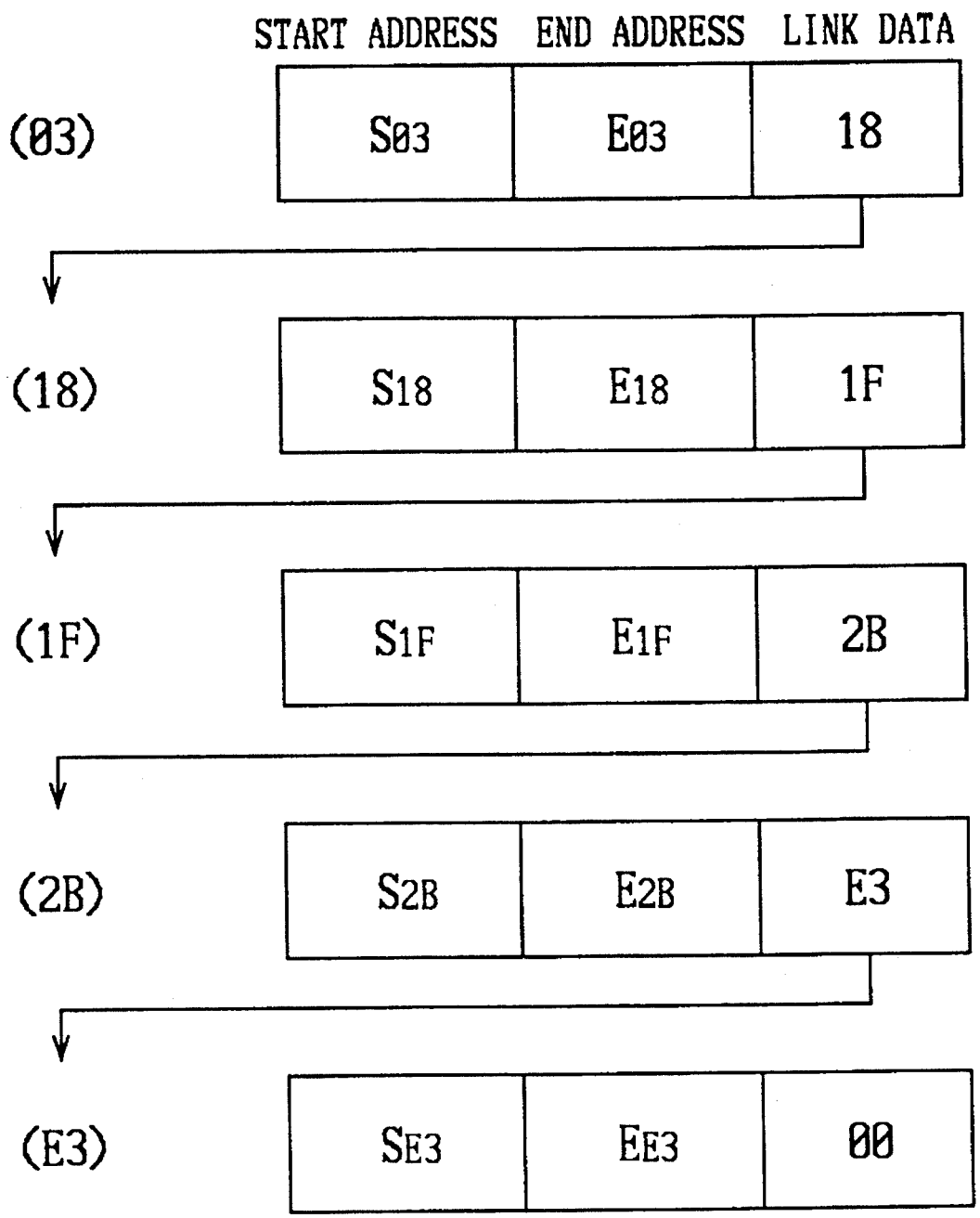
FIG. 5 is a schematic diagram illustrating the data structure of the management information (UTOC) of a recording and reproducing area.

The table pointer recorded in the area of FIG. 5 P-EMPTY (Pointer for Empty Slot) designates the head of the unused parts tables on the management table. As shown in FIG. 4, since there are only 255 parts in the parts table, even if there are more unrecorded areas on the magneto-optical disc, it is impossible to record more than 255 parts.

For example, when 255 pieces of music each being 10 seconds long are recorded onto the magneto-optical disc which has a 60 minute capacity, the optical disc is recorded with 10×255=2550 (sec)=42 (min) 30 (sec) of music. Even though the disc has 17 min. 30 sec. of remaining unrecorded capacity, no more music can be recorded because all the parts tables have been used.

The above example premises that 1 piece of music is composed of only 1 parts table, but as another example, if each piece of music is divided into two parts on the magneto-optical disc separately, no more than 123 pieces of music can be recorded.

The table pointer P-FRA (Pointer for FREE AREA) to be recorded in the area of FIG. 4 represents a data recordable area on the magneto-optical disc, and designates the beginning of the recordable parts table area.

When there is a recordable area, one of (01) to (FF) is recorded to the table pointer P-FRA. When there are any additional recordable areas, these are connected by the link data.

"(00)" is recorded to the end of the link data to signify "no link" and thus the end of the list.

FIG. 5 shows schematically the data structure of a free area managed by five parts tables.

This shows that, when each segment controlled by parts tables (03), (18), (1F), (2B), and (E3) are set as recordable areas, the recordable state is representing by the fact that the table pointer P-FRA points to the parts table (03) at the head of this list.

Note that, in addition to P-DFA, P-EMPTY, P-TNO1 to P-TNO255 have similar list data structures.

On the other hand, this recording and reproducing area 31 in FIG. 3 is managed by the UTOC. For example, the user wants to record a symbol of an arrow or the like on a map being displayed, the P-TNO1 is maintained as an area to be recorded with arrow data. Also, when the user wants to record voice data, the P-TNO2 is maintained as an area to be recorded with voice data. At this time, a start address and an end address are maintained having a predetermined address space used during recording.

The above recording data can be symbol, voice, character data, date and time, image data etc. Irrespective of the type of data, a P-TNO is allocated to each of them so that the start address and end address of the respective parts maintain the predetermined address space.

In the above embodiment, each P-TNO maintains the predetermined address space. However, if the above address space has been used already, a recordable area is searched from the P-FRA to maintain the new area and record thereto. At this time, it is apparent that this new parts table is connected by the link data.

Further, for example, if when searching for a symbol data, P-TNO1 is accessed, and all of data recorded thereto are read, and then the address, the latitude, and the longitude corresponding to the map data reproduced from the present displayed read-only area 30, it takes only a few minutes.

Then, for example as the P-TNO, a group of data recorded to the recording and reproducing area 31 in FIG. 3 corresponding to the address of the read-only area 30 in FIG. 3 is registered as a file for search, so that the search time is shortened.

In the case that the user supplements new map data (a new road, a new bridge, or the like) to the map data which has been preliminarily recorded in the read-only area 30, the recording and/or reproducing unit 10 records the address of the original data corresponding to the supplementing data, kind of supplementing data (characters and lines), supplementing time, date, etc. in the recording and reproducing area 31 of the magneto-optical disc 7.

When the supplementing data are characters, the recording and/or reproducing unit 10 records the row of the code of each character and the latitude, longitude, and height data to the recording and reproducing area 31, and when the supplementing data are lines, the color, and the latitude and longitude of the starting point and the ending point of each line are recorded in the recording and reproducing area 31.

When recording the user's symbol on the magneto-optical disc, the recording and/or reproducing unit 10 records the latitude, longitude, and height of the place designated by the user in the recording and reproducing area 31, or the address, the time and the date of the map data at the place designated by the user in the recording and reproducing area 31.

In the magneto-optical disc 7, voice as well as the user's symbol can also be recorded by the recording and/or reproducing unit 10. In this case, it is good enough to record, as the recording data, for example, the latitude and longitude of the user's symbol, the voice and/or symbol data, and the starting/ending addresses for writing the recorded voice in the recording and reproducing area 31. By doing this, the user can record his/her own information in a certain place with ease and in detail.

In this way, the magneto-optical disc 7 can record various user data in its recording and reproducing area 31 in a manner as having a relationship or correspondence with the map data which has been preliminarily recorded in the read-only area 30. As a consequence, the map data which has been preliminarily recorded in the read-only area 30 can be displayed on the screen 4 in a manner so as to correspond to the user data recorded in the recording and reproducing area 31.

In the case where the navigation system 1 includes a means for editing the user's symbol, the recording and/or reproducing unit 10 is designed such that in addition to the address, the time and the date, there can be recorded the information representative of the shape of the user's symbol in the recording and reproducing area 31. Similarly, in the case where the navigation system 1 includes a means for inputting an image, the recording and/or reproducing unit 10 is designed such that the image data can be recorded in the recording and reproducing area 31.

(4) Navigation Computer

Figure 6:
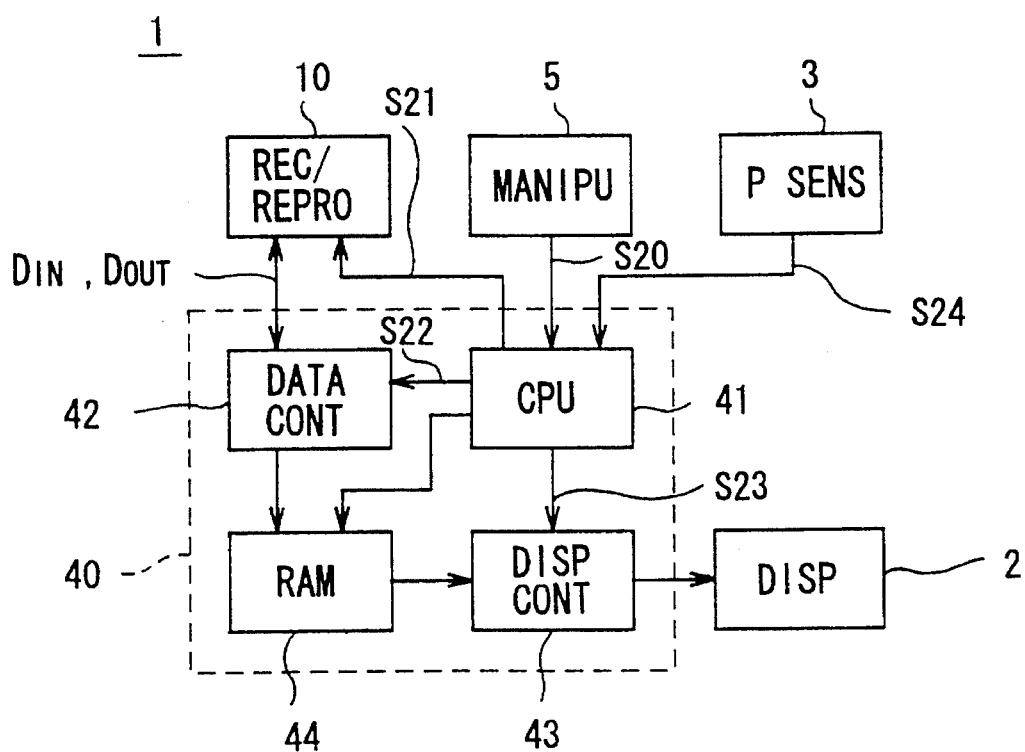
FIG. 6 is a block diagram showing the navigation system.

As shown in FIG. 6, the navigation system 1 is designed such that upon receipt of a control signal S20 from a user manipulation part 5, the CPU 41 of the navigation computer 40 sends control signals S21, S22, and S23 respectively to the data recording and/or reproducing unit 10, a data control unit 42, and a display control unit 43 in order to switch their modes in various ways, and also receives a position information signal S24 from the position sensor 3 so as to temporarily store the position information signal S24 in a memory (RAM) 44, and thereafter the CPU 41 combines the map data and user data from the recording and/or reproducing unit 10 with the position information S24 so as to supply the combined data to the display screen 2 through the display control unit 43.

Figure 7:
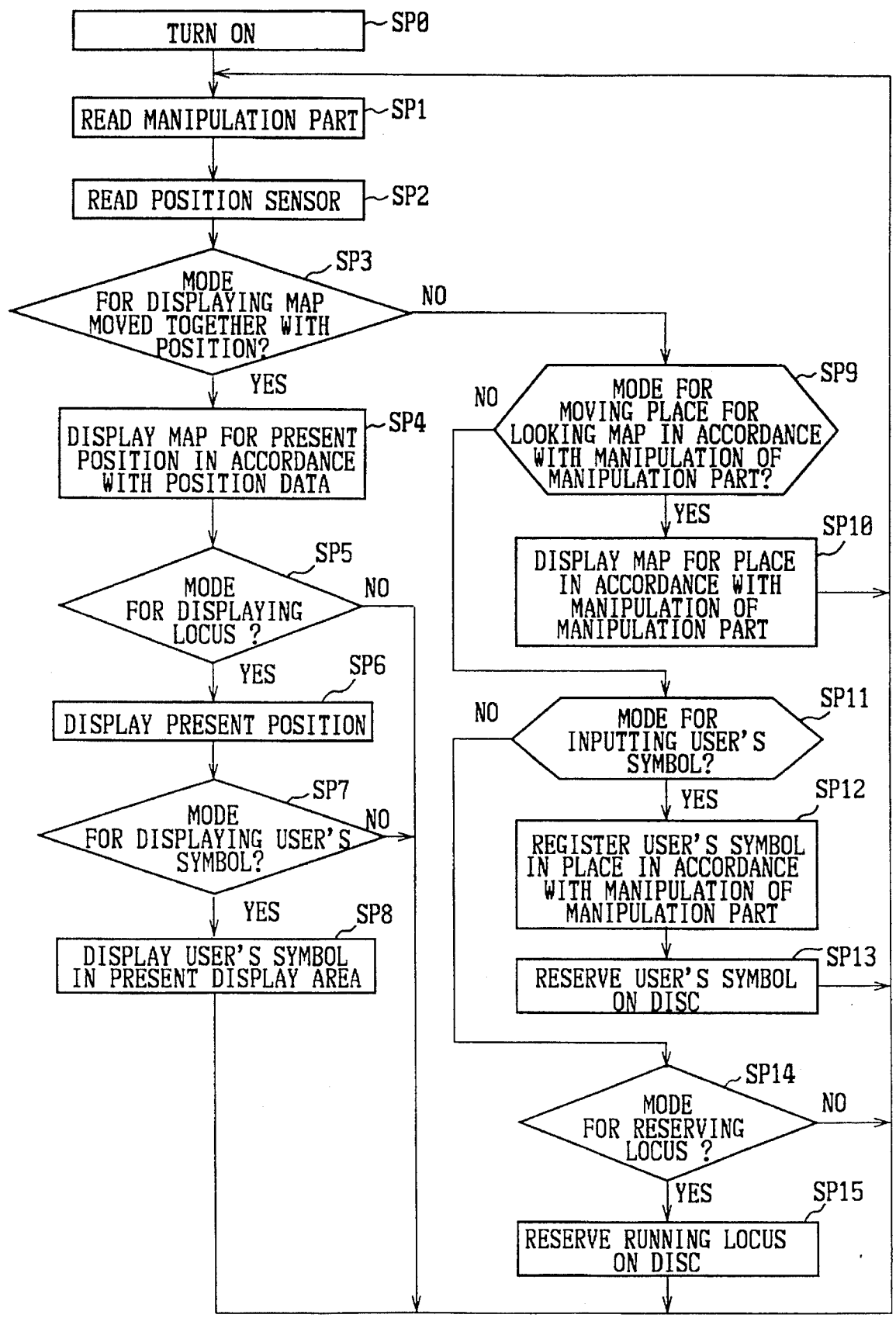
FIG. 7 is a flow chart showing the processing procedure of a navigation system.

As shown in FIG. 7 when the CPU 41 of the navigation computer 40 is turned on, the program enters to step SP1 from step SP0, in which the control signal S20 coming from the manipulation part 5 is read, and then the program proceeds to step SP2 where the position information signal S24 coming from the position sensor 3 is read.

Thereafter, the CPU 41 judges in step SP3 whether or not the system is in the mode for displaying the map moving together with the present position in accordance with the control signal S20 from the manipulation portion 5. If an affirmative result is obtained here, the program proceeds to step SP4.

Figure 8:
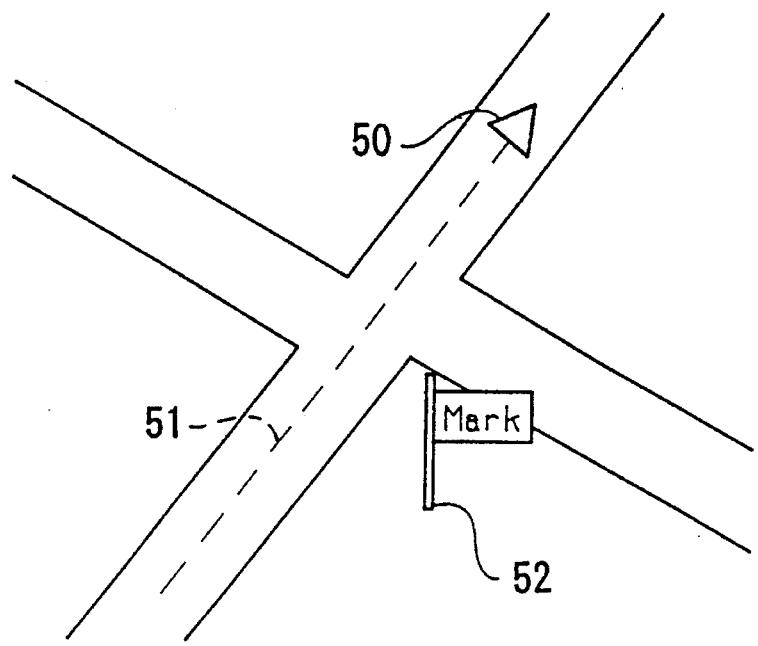
FIG. 8 is a schematic diagram explaining a running locus and a user's symbol.

In step SP4, the CPU 41 sends the control signal S21 to the recording and/or reproducing unit 10. By doing this, in the navigation system 1, the map data corresponding to the positional information from the position sensor 3 is read from the read-only area 30 of the recording medium 7 so as to display the map indicative of the present position and its neighborhood on the display screen 2 and also to display a mark 50 indicative of the present position on the map as shown in FIG. 8. The user's symbol 52 could mark a location, for example the site of a landmark, on the map. It could also indicate recorded voice or image data, for example.

Thereafter, the CPU 41 judges in step SP5 whether or not it is in the mode for displaying a locus in accordance with the control signal S20 from the user manipulation part 5. If an affirmative result is obtained here, the program proceeds to step SP6 in which a running locus 51 (FIG. 8) up to the present position is displayed on the map which is already displayed on the screen 2.

In contrast, if a negative result is obtained in step SP5, the program returns to step SP1 where the CPU 41 reads the control signal S20 again from the manipulation part 5.

In step SP7, the CPU 7 judges whether or not it is the mode for displaying the user's symbol in accordance with the control signal S20 from the user manipulation part 5. If the mode for displaying the user's symbol is already set by the user manipulation part 5, the CPU 41 displays a user's symbol 52 in step SP8 consisting of a flag mark, for example, on the display screen 2 as shown in FIG. 8.

That is, the navigation system 1 is designed such that, in step SP7, the map data is read from the read-only area 30 of the magneto-optical disc 7 by the recording and/or reproducing unit 10 and the user's symbol data in which the address corresponds to that of the particular map data is read from the recording and reproducing area 31, and then these data are displayed on the display screen 2, respectively.

If the judgment in step SP3 is negative, the program proceeds to step SP9. In step SP9, the CPU 41 judges whether or not it is in the mode for moving the place for looking at the map through the manipulation of the user manipulation part 5, in accordance with the control signal S20 from the user manipulation part 5. In other words, it judges whether or not it is in the mode for searching a desired map. If the judgment result is affirmative here, the program proceeds to step SP10 where the map data are read one after another from the read-only area 30 of the magneto-optical disc 7 in accordance with the manipulation of the user manipulation part 5, and the desired map is displayed on the display screen 2 by scrolling the map on the display screen 2.

In contrast, if the judgment result in step SP9 is negative, the program proceeds to step SP11 where the CPU 41 judges whether or not the mode set by the user manipulation part 5 is the mode for inputting the user's symbol mark.

If the judgment result in step SP11 is affirmative, the program proceeds to step SP12 where the CPU 41 registers the user's symbol mark in place corresponding to the manipulation of the user manipulation part 5. Thereafter, the program proceeds to step SP13 where the CPU 41 records the user's symbol on the magneto-optical disc 7.

That is, in the navigation system 1, the address of the user's symbol is recorded in the recording and/or reproducing area 31 in a manner as to correspond to the map data recorded in the read-only area 30 of the magneto-optical disc 7 in step SP13.

In contrast, if the judgment result in step SP11 is negative, the program proceeds to step SP14 where the CPU 41 judges whether or not the mode set by the user manipulation part 5 is a mode for reserving the locus.

If the judgment result in step SP14 is affirmative, the program proceeds to step SP15 where the CPU 41 records the running locus on the magneto-optical disc 7.

That is, in the navigation system 1, the latitude, the longitude, the height, and the time and the date obtained by the position sensor 3 are recorded in the recording and/or reproducing area 31 of the magneto-optical disc 7 in step SP15.

In above step SP7, only the embodiment of the user symbol display mode is shown. However, this invention is not only limited to this, but may display recorded date and time, voice data, image data in accordance with the user manipulation part.

It is understood that, also in step SP11, it is determined from the user manipulation part whether the input mode specifies the recording of the date and time, and whether the user's symbol is voice data or image data.

(5) Operation of the Embodiment

A concrete example of the reproducing method will be described below. For example, with respect to the latitude, longitude, and height which are detected by the position sensor 3 shown in FIG. 6, the CPU 41 reads and supplies PTOC data to the recording and/or reproducing unit 10, to read the file number corresponding to the position data which is detected by the position sensor 3 from the above data table, and the address data recorded on the disc.

Next, the map data are read by accessing to the read file number and address data, and outputting it to a data control part 42 as output data DOUT. The output data DOUT is temporarily stored in RAM 44, and then transmitted to a display control part 43 as map data, so that the map can be displayed on a display 2.

With the construction mentioned above, the navigation system 1 reads the map data from the read-only area 30 of the magneto-optical disc 7 and displays the map data on the display screen 2.

At this time, when the user sets the mode in various ways through manipulation of the user manipulation part 5, the navigation system 1 performs the processing in accordance with this mode.

For example, when the user sets a mode for displaying the present position on the display screen 2, the mark 50 (in FIG. 8) indicative of the present position is displayed on the display screen 2 in accordance with the positional information from the position sensor 3.

When this mark 50 moves in accordance with motion of the vehicle, the navigation system 1 reads the map data corresponding to the movement of the mark 50 one after another from the read-only area 30 and displays the same on the display screen 2.

When the user sets the mode for searching the desired map, the navigation system 1 reads the map data from the read-only area 30 of the magneto-optical disc 7 one after another in accordance with the user's manipulation of the user manipulation part 5 and displays the same on the display screen 2.

When the user sets the mode for reserving the user's symbol 52 (in FIG. 8), the user displays the desired map on the display screen 2 through his/her manipulation of the user manipulation part 5 in the same mode for searching the map. Thereafter, when the user designates a position on the map where the user's symbol 52 is to be set through his/her manipulation of the user manipulation part 5, the navigation system 1 records the address of the read-only area 30 corresponding to the designated position or the latitude, longitude, and height of the designated position, the recording time, and the data in the recording and reproducing area 31 of the magneto-optical disc 7.

When the user sets the mode for reserving the locus, the navigation system 1 records the latitude, the longitude, the height, the time and the date obtained by the position sensor 3 in the recording and reproducing area 31 of the magneto-optical disc 7.

Let's presume here, for example, that the user drives a vehicle using the navigation system 1 as a device to be mounted in a vehicle and records the running locus to the destination at that time as well as the user's symbols indicative of the places to which attention should be paid, and the user decides to go to the same destination later again but by train this time, carrying the navigation system 1 with him or her. In this case, by using the map which was used when the user traveled by vehicle, as a portable one, there can be realized a visit to the same destination via the same route in spite of the fact that the later visit is made at an entirely different time and through a different transportation means.

Also, when, for example, the user preliminarily records at home the user's symbol in that place where the user wants to go using a navigation system 1 which is designed for home use, and the magneto-optical disc 7 on which the user's symbol now has been recorded is used in the navigation system 1 to be mounted in a vehicle, the user can easily go to the destination which has been preliminarily recorded at home.

Also, when, for example, the magneto-optical disc 7 on which the running locus, the user's symbol, etc. has been recorded by a first user, is used and reproduced by a second user in a different navigation system 1 which is mounted on a different vehicle, the second user can drive the vehicle with reference to the running locus, the user's symbols, etc. recorded by the first user.

Also, when it occurs that a new road is constructed, or the like, the user can prepare a new map by marking that road on the old map and recording this data in the recording medium. In this case, the new road or the like can easily be indicated on the old map by using such input means as, for example, a touch pen.

In the above embodiment, a case has been described wherein the mode can be switched in various ways by the cursor type manipulating element 5C (FIG. 1). However, the user manipulation means of the present invention is not limited to this. Alternatively, such manipulation means as a joy stick type manipulating element, a roller type manipulating element, a remote controller, or the like is applicable.

Furthermore, in the above embodiment, a case has been described wherein the magneto-optical disc 7 having a diameter of 64 (mm) is used. However, the present invention is not limited to this. Alternatively, magneto-optical discs having a wide range of sizes are likewise applicable.

Figure 9:
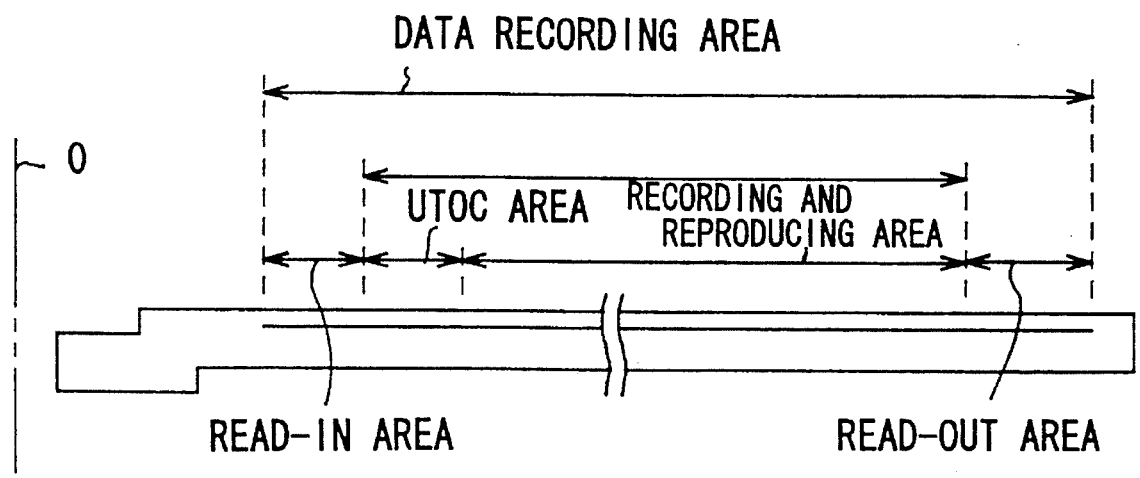
FIG. 9 is a schematic diagram showing a data construction for another embodiment of a magneto-optical disc.

Similarly, in the above embodiment, a case has been described wherein a composite disc including the read-only area 30 formed with a pre-pit and the recordable recording and reproducing area 31 is used. However, the present invention is not limited to this. Otherwise, as shown in FIG. 9, there can be used a recording and/or reproducing disc having a vertical magnetized film formed on its entire surface, which is capable of recording/reproducing desired data on the whole disk.

While the invention has been described in connection with the preferred embodiments, it will be obvious to those skilled in the art that various changes and modifications may be made without departing from the spirit and scope of the invention. The appended claims are intended to cover all such changes and modifications.

What is claimed is:

1. A navigation system comprising:

a position sensor for detecting a present position information upon receipt of a radio wave from a satellite and for outputting a position information signal;

user manipulation means for allowing the user to operate said system and for outputting first control signals;

navigation control means, responsive to the first control signals and the position information signal, for calculating a present display position and for generating second control signals and a present display position signal;

recording means, controlled by said second control signals, for recording user digital data from said navigation control means in a second area of an optical disc;

reproducing means, controlled by said second control signals, for reproducing map digital data which has been recorded preliminarily in a first area of said optical disc, and said user digital data recorded in said second area of said optical disc; and display means for displaying a predetermined display image in accordance with a reproducing signal obtained from said reproducing means and the present display position signal obtained from said navigation control means.

2. A navigation system according to claim 1, wherein said data to be recorded in the second area is any one of locus, date and time, and voice data.

3. A navigation system according to claim 1, wherein said user digital data to be recorded in the second area is made up of a series of one or more linked segments, and wherein each series of linked segments of said user digital data to be recorded in the second area is referenced to said map digital data which has been recorded preliminarily in the first area.

4. A navigation system according to claim 1, wherein said user digital data to be recorded in the second area includes address information on the optical disc of said map digital data which corresponds to said user digital data and which has been recorded preliminarily in the first area.

5. A navigation system according to claim 1 wherein said map digital data which has been recorded preliminarily in said first area of said optical disc includes latitude and longitude information, and wherein a date and time of recording are recorded along with said user digital data to be recorded in the second area.

6. An optical disc recording medium comprising:

a read-only recording region having a map subregion on which map digital data are prerecorded and having a program table subregion on which a program table of contents (PTOC) which includes digital addresses of the map digital data on the optical disc recording medium is pre-recorded; and a recording and reproducing region having a user annotation subregion on which a user of the optical disc recording medium can magneto-optically record annotation digital data information, with respect to the map digital data, and having a user table subregion on which a user table of contents (UTOC) which includes digital addresses of the annotation digital data can be magneto-optically recorded.

7. A recording medium according to claim 6, wherein said annotation digital data is any one of locus data, date and time data, and voice data.

8. A recording medium according to claim 6, wherein said annotation digital data is made up of a series of one or more linked segments and each series is referenced to a portion of said map digital data which has been pre-recorded.

9. A recording medium according to claim 8, wherein said annotation digital data includes address information on the optical disc recording medium of said map digital data.

10. A recording medium according to claim 8, wherein said annotation digital data includes at least any one of latitude and longitude of said map digital data and a date and time.

11. A reproducing method for a navigation system which includes:

a position sensor for detecting a present position information upon receipt of a radio wave from a satellite and for outputting a position information signal;

user manipulation means for allowing the user to operate said system;

navigation control means for calculating a present display position corresponding to a control signal from said user manipulation means and said position information signal output from said position sensor, and for generating control signals;

reproducing means to be controlled by said control signals of said navigation control means and for reproducing map digital data which has been recorded preliminarily in a first area of an optical disc, and annotation digital data recorded in a second area of said optical disc; and display means for displaying a predetermined display image in accordance with a reproducing signal obtained from said reproducing means and a position display information obtained from said navigation control means;

said reproducing method comprising the steps of:
  determining whether or not the system is in a mode for displaying the annotation digital data recorded in the second area;
  reading from said second area annotation digital data corresponding to said map digital data read from the first area when said determination step has resulted in a conclusion that the system is in the mode for displaying the annotation digital data recorded in the second area; and
  displaying said read data on said display means.

12. A reproducing method according to claim 11, wherein said annotation digital data recorded in the second area includes an address information of said map digital data recorded in the first area.

13. A reproducing method according to claim 11, wherein said annotation digital data recorded in the second area includes at least any one of a latitude and a longitude corresponding to said map digital data recorded in the first area, and date and time data.

14. A reproducing method for a navigation system which includes;

a position sensor for detecting a present position information upon receipt of a radio wave from a satellite and for outputting a position information signal;

user manipulation means for allowing the user to operate said system;

navigation control means for calculating a present display position from said position information signal in response to a first control signal from said user manipulation means, and for generating second control signals;

recording means to be controlled by said second control signals of said navigation control means and for recording user digital data from said navigation control means in a second area of an optical disc;

reproducing means to be controlled by said second control signals of said navigation control means and for reproducing a map digital data which has been recorded preliminarily in a first area of said optical disc, and said user digital data recorded in said second area of said optical disc; and display means for displaying a predetermined display image in accordance with a reproducing signal obtained from said reproducing means and display position information obtained from said navigation control means;

said reproducing method comprising the steps of:
  determining whether or not to record data in the second area; and
  adding said user digital data reproduced from the second area of said optical disc to said map digital data read from said first area to produce combined data when said determination step has resulted in a conclusion that the system is in a recording mode and recording the combined data to said second area of said optical disc.

15. A reproducing method according to claim 14, wherein said user digital data recorded in the second area includes an address information of said map digital data recorded in the first area.

16. A reproducing method according to claim 14, wherein said user digital data recorded in the second area includes at least any one of the latitude and longitude corresponding to said map digital data recorded in the first area, and a date and time of recording.

17. A navigation method comprising the steps of:

detecting a present position information upon receipt of a radio wave from a satellite and for outputting a position information signal;

interactively inputting first control signals and user digital data;

calculating, in response to the first control signals and the position information signal, a present position and generating second control signals and a present display position signal;

recording, in response to the second control signals, user digital data in a second area of an optical disc;

reproducing pre-recorded map digital data, in response to the second control signals, from a first area of the optical disc and said user digital data recorded in the second area of the optical disc; and displaying a predetermined display image in accordance with a reproducing signal obtained during the reproducing step and the present display position signal.

18. A navigation method according to claim 17, wherein the step of recording as user digital data in the second area comprises recording any one of locus, date and time, and voice data.

19. A navigation method according to claim 17, wherein the step of recording user digital data comprises recording segments of user digital data, each segment being referenced to the map digital data which has been pre-recorded in the first area.

20. A navigation method according to claim 17, wherein the user digital data to be recorded in the second area includes address information on the optical disc of the map digital data which has been recorded preliminarily in the first area.

21. A navigation method according to claim 17 wherein the latitude and longitude of the map digital data which has been pre-recorded in the first area, and a date and time of recording are recorded along with the user digital data to be recorded in the second area.

22. A navigation system according to claim 1, wherein the navigation control means, in response to the first control signals, determines whether or not to record data in the second area and adds the user digital data reproduced from the second area of the optical disc to the map digital data read from the first area to produce combined data and controls the recording means to record the combined data on the second area of the optical disc.

23. A navigation system comprising:
 a position sensor for detecting a present position information upon receipt of a radio wave from a satellite and for outputting a position information signal;
 user manipulation means for allowing the user to determine operation modes and for outputting first control signals;
 navigation control means, responsive to the first control signals and the position information signal, for calculating a present position information and for generating second control signals and a present position signal respectively;
 reproducing means, controlled by said second control signals, for reproducing map digital data which has been recorded preliminarily in a first area of an optical disc and user digital data recorded in a second area of said optical disc;
 recording means, controlled by said second control signals, for recording data from said navigation control means in said second area of said optical disc; and
 display means for displaying a predetermined display image in accordance with at least one of said reproducing map digital data obtained from said reproducing means, the present position signal obtained from said navigation control means and inputted data from said user manipulation means.

24. A navigation system according to claim 23, wherein said data to be recorded in the second area is any one of locus, date and time, and voice data.

25. A navigation system according to claim 23, wherein each segment of a plurality of segments of said user digital data to be recorded in the second area is referenced to said map digital data which has been recorded preliminarily in the first area.

26. A navigation system according to claim 23, wherein said user digital data to be recorded in the second area includes address information on the optical disc of said map digital data which has been recorded preliminarily in the first area.

27. A navigation system according to claim 23 wherein latitude and longitude data of said map information which has been recorded preliminarily in the first area, and a date and time of recording are recorded along with said user digital data to be recorded in the second area.

28. An optical disc recording medium including read-only areas and recordable and reproducible areas comprising:
 a first read-only area on which map digital data is pre-recorded;
 a second read-only area on which a program table of contents for recorded address information on the optical disc recording medium is pre-recorded;
 a first recordable and reproducible area on which a user of the optical disc recording medium can magneto-optically record annotation digital data information;
 a second recordable and reproducible area on which a user table of contents for recorded address information for annotation digital data on the optical disc recording medium can be recorded.

29. A recording medium according to claim 28, wherein said annotation digital data is any one of locus data, date and time data, and voice data.

30. A recording medium according to claim 28, wherein said annotation digital data is made up of segments and each segment is referenced to a portion of said map digital data which has been pre-recorded.

31. A recording medium according to claim 30, wherein said annotation digital data includes address information on the optical disc recording medium of said map digital data.

32. A recording medium according to claim 30, wherein said annotation digital data includes at least any one of the latitude and longitude of said map digital data and a date and time.

33. A reproducing method for a navigation system which includes:
 a position sensor for detecting a present position information upon receipt of a radio wave from a satellite and for outputting a position information signal;
 user manipulation means for allowing the user to determine operation modes of said system and for outputting a first control signal;
 navigation control means for calculating a present position information corresponding to said first control signal from said user manipulation means, and for a generating second control signal respectively;
 reproducing means to be controlled by said second control signal of said navigation control means and for reproducing map digital data which has been recorded preliminarily in a first area of an optical disc, and annotation digital data recorded in a second area of said optical disc; and
 display means for displaying a predetermined display image in accordance with at least one of reproduced map digital data obtained from said reproducing means, the present position information obtained from said navigation control means and inputted data from said user manipulation means;
 said reproducing method comprising the steps of:
  (a) determining whether or not said system is in a mode for displaying the annotation digital data recorded in the second area;
  (b) reading from said second area annotation digital data corresponding to said map digital data read from the first area when it is determined in step (a) that the system is in the mode for displaying the annotation digital data recorded in the second area; and (c) displaying said read data on said display means.

34. A reproducing method according to claim 33, wherein said reading step includes reading annotation digital data recorded in the second area which includes an address information of said map digital data corresponding to said data recorded in the first area.

35. A reproducing method according to claim 33, wherein said reading step includes reading annotation digital data recorded in the second area which includes at least any one of a latitude and a longitude corresponding to said map digital data recorded in the first area, and date and time data.

36. A recording method for a navigation system which includes:
- a position sensor for detecting a present position information upon receipt of a radio wave from a satellite and for outputting a position information signal;
- user manipulation means for allowing the user to determine operating modes of said system and for outputting a first control signal;
- navigation control means for calculating a present position information in accordance with said position information signal in response to said first control signal from said user manipulation means, and for generating a second control signal respectively;
- reproducing means to be controlled by said second control signal of said navigation control means and for reproducing map digital data which has been recorded preliminarily in a first area of an optical disc, and annotation digital data recorded in a second area of said optical disc; and
- display means for displaying a predetermined display image in accordance with at least one of said reproducing map digital data obtained from said reproducing means, the present position information obtained from said navigation control means and inputted data from said user manipulation means;

said recording method comprising the steps of:
(a) determining whether or not to record data in the second area;
(b) adding said annotation digital data reproduced from the second area of said optical disc to said map digital data read from said first area to produce combined data when said step (a) has resulted in a conclusion that the system is in a recording mode and recording the combined data to said optical disc;
(c) reading from said second area annotation digital data corresponding to said map digital data read from the first area when step (a) has resulted in a conclusion that the system is in the mode for displaying the annotation digital data recorded in the second area; and
(d) displaying said read annotation digital data on said display means.

37. A reproducing method according to claim 36, wherein said reading step includes reading annotation digital data recorded in the second area which includes an address information of said map digital data recorded in the first area.

38. A reproducing method according to claim 36, wherein said reading step includes reading annotation digital data recorded in the second area which includes at least any one of the latitude and longitude corresponding to said map digital data recorded in the first area, and a date and time of recording.

39. A navigation method comprising steps of:
- detecting a present position information upon receipt of a radio wave from a satellite and for outputting a position information signal;
- interactively inputting a first control signal and user digital data;
- calculating, in response to said first control signal and the position information signal, a present position and generating a second control signal and a present position signal;
- reproducing pre-recorded map digital data, in response to the second control signal, from a first area of an optical disc and user digital data recorded in a second area of the optical disc;
- recording, in response to said second control signal, the user digital data in the second area of the optical disc; and
- displaying a predetermined display image in accordance with at least one of said reproducing prerecorded map digital data, said present position signal and said inputted user digital data.

40. A navigation method according to claim 39, wherein the step of recording as user digital data in the second area comprises recording any one of locus, date and time, and voice data.

41. A navigation method according to claim 39, wherein the step of recording user digital data comprises recording segments of user digital data, each segment being referenced to the map digital data which has been pre-recorded in the first area.

42. A navigation method according to claim 39, wherein the recording step includes recording user digital data in the second area that includes address information on the optical disc of the map digital data which has been recorded preliminarily in the first area.

43. A navigation method according to claim 39 wherein the recording step includes recording the latitude and longitude of the map digital data which has been pre-recorded in the first area, and a date and time of recording along with the user digital data to be recorded in the second area.

44. A navigation system according to claim 23, wherein the navigation means, in response to the first control signals, determines whether or not to record data in the second area and adds the user digital data reproduced from the second area of the optical disc to the map digital data read from the first area to produce combined data and controls the recording means to record the combined data on the second area of the optical disc.

* * * * *